United States Patent
Zheng et al.

(10) Patent No.: US 11,886,191 B2
(45) Date of Patent: Jan. 30, 2024

(54) SCHEDULING METHOD AND SYSTEM FOR FULLY AUTONOMOUS WATERBORNE INTER TERMINAL TRANSPORTATION

(71) Applicant: ZHEJIANG UNIVERSITY, Hangzhou (CN)

(72) Inventors: Huarong Zheng, Hangzhou (CN); Wen Xu, Hangzhou (CN); Dongfang Ma, Hangzhou (CN); Fengzhong Qu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 243 days.

(21) Appl. No.: 17/408,480

(22) Filed: Aug. 22, 2021

(65) Prior Publication Data
US 2022/0035374 A1    Feb. 3, 2022

Related U.S. Application Data

(63) Continuation of application No. PCT/CN2020/105407, filed on Jul. 29, 2020.

(51) Int. Cl.
| | |
|---|---|
| *G05D 1/02* | (2020.01) |
| *B63B 79/40* | (2020.01) |
| *G05B 17/02* | (2006.01) |
| *B63B 79/20* | (2020.01) |
| *G08G 3/00* | (2006.01) |
| *G05D 1/00* | (2006.01) |

(52) U.S. Cl.
CPC ............ *G05D 1/0206* (2013.01); *B63B 79/20* (2020.01); *B63B 79/40* (2020.01); *G05B 17/02* (2013.01); *G05D 1/0088* (2013.01); *G08G 3/00* (2013.01)

(58) Field of Classification Search
CPC .... G05D 1/0206; G05D 1/0088; B63B 79/40; B63B 79/20; G05B 17/02; G08G 3/00
USPC .......................................................... 701/21
See application file for complete search history.

(56) References Cited

U.S. PATENT DOCUMENTS

| | | | |
|---|---|---|---|
| 11,091,211 B1* | 8/2021 | Ebrahimi Afrouzi .. | B62D 24/00 |
| 2019/0080271 A1 | 3/2019 | Pei et al. | |
| 2021/0089055 A1* | 3/2021 | Tran ........................ | B64C 27/20 |
| 2021/0334650 A1* | 10/2021 | Celano ..................... | G06N 3/08 |
| 2022/0118815 A1* | 4/2022 | Baerentz .............. | B60H 1/0073 |

FOREIGN PATENT DOCUMENTS

| | | |
|---|---|---|
| CN | 103186879 A | 7/2013 |
| CN | 103413209 A | 11/2013 |
| CN | 104036380 A | 9/2014 |

(Continued)

*Primary Examiner* — Mahmoud S Ismail
(74) *Attorney, Agent, or Firm* — W&G Law Group

(57) ABSTRACT

The present application discloses is a scheduling method and system for fully autonomous waterborne inter terminal transportation, and belongs to the field of transportation. The method includes: establishing a dynamic scheduling model for waterborne Autonomous guided vessels (wAGVs); quickly inserting the dynamically arriving transportation tasks into all the existing wAGV paths, calculating the insertion cost and selecting the path and position with the lowest insertion cost to obtain updated initial paths; improving the initial path using a heuristic algorithm based on tabu search to obtain quasi-optimal wAGV paths; executing the scheduling wAGV paths.

7 Claims, 8 Drawing Sheets

(56) References Cited

FOREIGN PATENT DOCUMENTS

| | | | |
|---|---|---|---|
| CN | 108665179 | A | 10/2018 |
| CN | 108985597 | A | 12/2018 |
| CN | 111242368 | A | 6/2020 |

* cited by examiner

100 # SCHEDULING METHOD AND SYSTEM FOR FULLY AUTONOMOUS WATERBORNE INTER TERMINAL TRANSPORTATION

TECHNICAL FIELD

The present application belongs to the field of transportation, and relates to a method and a system for the fully autonomous waterborne inter terminal transportation scheduling, in particular to a method for the fully autonomous control and scheduling of unmanned ships for the waterborne container transportation between terminals within large ports, thereby realizing unmanned operations.

BACKGROUND

Large ports usually involve multiple terminals, and their geographical locations are scattered. In order to cope with the increasing terminal business, most terminals have relied on Automated Guided Vehicles (AGVs) to realize full automation. However, there are also a large number of container transportation within a port area among terminals with different functions, such as vacant terminals and multimodal transfer terminals. At present, trailers are mainly used to complete this kind of transportation. However, for ports with complex geographical layouts, such as the port of Rotterdam, the distances between some terminals by water are far shorter than that by land. In these cases, the transportation cost and energy consumption can be further reduced by means of waterborne transportation. Therefore, a waterborne autonomous guided vessel (wAGV) system is proposed to realize autonomous inter terminal transportation. The transportation system needs to realize autonomous scheduling of multiple wAGVs.

The current scheduling algorithm is mainly based on Vehicle routing problem, (VRP), which usually comes with time window and capacity constraints. For container transportation between terminals, it is necessary to consider the constraints such as pickup followed by delivery without transshipment. The VRP based scheduling method has been widely used in take-out, taxi or ambulance scheduling, etc. One of the common features of these problems is that the transportation tasks may come online with the implementation of the previously planned path. Therefore, the planned path needs to be adjusted according to the new transportation tasks.

In dynamic VRP, insertion method is usually used to add the new transportation tasks into the existing paths. An alternative way is to accumulate the transportation tasks for a period of time before assigning them to vehicles by waiting and buffering. According to this idea, the rolling horizon method is widely used, that is, the transportation tasks over a certain time period in the future are re-planned at certain intervals but only a myopic part of the planned routes are implemented. Therefore, dynamic scheduling requires algorithms with higher computational efficiency. At present, common algorithms for solving scheduling problems include exact algorithms such as dynamic programming, column generation, branch pricing, etc., and heuristic algorithms such as tabu search, neighborhood search, local descent search, evolutionary algorithm or a combination of these methods. The exact solution algorithms can usually produce optimal solutions. However, the computational time is long and is only suitable for small-scale static scheduling problems. Heuristic algorithms are computationally efficient. However, they can only produce quasi-optimal solutions. Considering the real-time performance of dynamic scheduling, heuristic algorithms are generally used. However, the existing scheduling models mostly consider static problems and land transportation systems. The task of container transportation between terminals actually arrives dynamically, and the loading and unloading time of containers at terminals cannot be ignored. Therefore, a new dynamic scheduling model over water needs to be established. Moreover, in land-side transportation scheduling problems, the distance between nodes is approximated as an straight line Euclidean distance. However, the geographical layout of terminals within large ports is complex, and the waterway distance cannot be calculated simply as the straight line Euclidean distance. Considering the dynamic nature of the problem, the existing scheduling models are not applicable. Waterway transportation, especially the new dynamic scheduling problem of wAGVs between terminals, has not been studied. In addition, dynamic scheduling needs to be solved online in real time, and the existing algorithms do not consider the characteristics of this new scheduling problem. Therefore, it is necessary to propose a new efficient solution algorithm. There is no public research on the dynamic scheduling system of autonomous container transportation between terminals within large ports by wAGVs.

SUMMARY

The purpose of the present application is to fill in the gap of the state-of-the-art, and provide a scheduling method and system for the fully autonomous inter terminal waterborne transportation. The scheduling model of the present application is based on the combinatorial optimization, and considers performance indexes such as transportation distance and customer satisfaction, and constraints such as time window, capacity, pickup followed by delivery, container loading and unloading time, etc. An initial path is first constructed by using an insertion method within the framework of rolling horizon. The initial path is then optimized and improved by designing a tabu search heuristic so that quasi-optimal multi-wAGV paths are obtained in real time. This system is helpful to further improve the autonomy level of large ports.

The technical solution of the present application is as follows:

The present application firstly discloses a scheduling method and system for the fully autonomous waterborne inter terminal transportation, comprising the following steps:

1) modeling against a fully autonomous waterborne inter terminal transportation scheduling problem, establishing a wAGV-oriented mixed integer programming dynamic scheduling model, and solving the mixed integer programming problem to obtain a starting optimal path for the scheduling system;
2) inserting a newly arrived transportation task into the possible positions in all the existing paths of wAGVs that are calculated in the previous step but has not been completely executed within a rolling horizon framework, and calculating the corresponding insertion cost, comparing and selecting paths and positions that are with the minimal cost, inserting the task into the path, processing all the newly arrived transportation tasks in turn and obtaining updated initial paths;
3) based on the updated initial paths, using a heuristic algorithm based on tabu search to further improve the initial path, and obtaining a final scheduling scheme at the current time step, wherein the final scheduling scheme consists of paths of all the wAGVs; the paths of all the wAGVs include terminal node sequences to be visited by all the wAGVs, corresponding visiting times, service times and the number of loading and unloading containers in TEUs;

4) scheduling the wAGVs according to the paths of all the wAGVs obtained by the solution, and repeating steps 2) to 4) for each new time step.

According to an embodiment of the present application, performance indexes of the dynamic scheduling model are as follows:

$$\min c_1 \Sigma_{v \in V} \sum_{(i,j) \in \mathcal{A}} x_{ijv} D_{ij} + c_2 \|w\|_1 + c_3 \|d\|_1 \qquad (1)$$

where $c_1$, $c_2$ and $c_3$ are the weight coefficients of the three performance indexes in the model, wherein the first item minimizes the total driving distance, and the second item and the third item minimize the waiting time and the delay time, respectively; $x_{ijv}(k)$ is a binary variable with value of 0 or 1; for all $(i,j) \in \mathcal{A}(k)$, $v \in V$, if wAGV v travels from node i to node j, then $x_{ijv}(k)=1$; otherwise $x_{ijv}(k)=0$; V is a fleet set with $n_v$ wAGVs; $D_{ij}$ is the waterway distance between the nodes i and j; vector $w=[w_i^t]$, $i \in \mathcal{N}(k)$, where $w_i^t$ represents the waiting time at the node i; vector $d=[d_i^t]$, $i \in \mathcal{N}(k)$, where $d_i^t$ represents the delay time at the node i; $\|\cdot\|_1$ represents the 1 norm; $\mathcal{N}(k)$ is a node set of the inter terminal scheduling transport network, and $\mathcal{A}(k)$ is the edge set of the inter terminal scheduling transport network.

The present application further discloses a system for fully autonomous waterborne inter terminal transportation scheduling, comprising a wAGV system, an initial path solving module of the dynamic scheduling model, an initial path construction module, a real-time optimization module and a scheduling module; wherein the wAGV system comprises a fleet of wAGVs, which are controlled by the scheduling module to execute transportation tasks;

the initial path solving module of the dynamic scheduling model is configured for acquiring parameters involved in defining the dynamic scheduling model, establishing the dynamic scheduling model, determining constraints of the model and acquiring a first starting scheduling path of the scheduling system;

the initial path construction module is configured for inserting new transportation tasks into the possible positions in all the existing wAGV paths according to the paths calculated in the previous step but has not been completely executed within a rolling horizon framework, calculating the insertion cost and selects paths and corresponding positions with the lowest insertion cost, selecting the paths and positions corresponding to the minimum cost, inserting the task into updated paths, and sequentially processing all new transportation tasks and obtaining updated initial paths;

the real-time optimization module is configured by adopting a heuristic algorithm based on tabu search, combining the initial paths obtained by the initial path construction module and constraints of the dynamic scheduling model to obtain a quasi-optimal scheduling result within the rolling horizon framework, and realizing the real-time scheduling system; and the scheduling module is configured for controlling, according to the scheduled paths obtained by the real-time optimization module, the wAGVs to visit specific terminals at specific times, picking up or unloading a specific number of containers, and completing the assigned transportation task in an approximately shortest driving path with the minimum waiting time and delay time.

Compared with the prior art, the present application novely puts forward a dynamic scheduling model and a real-time solution algorithm for container transportation among multiple terminals in a port by using unmanned container ships, thereby realizing an autonomous waterborne transportation system among terminals within large ports, and further improving the autonomy level of large ports. This scheduling model fully considers the complexity of waterway transportation network of the port, the dynamic states of wAGVs and transportation tasks. Based on the rolling horizon framework, a multi-wAGV pick-up and delivery combinatorial optimization model with the shortest transportation distance and the highest customer satisfaction is constructed. A heuristic algorithm is proposed to obtain the quasi-optimal solution of the scheduling system in real time. A simulation experiment is carried out by using the transportation data among multiple terminals in the port of Rotterdam, which proves that all the transportation tasks are completed within the time windows, indicating the effectiveness of the scheduling method of the present application.

DESCRIPTION OF EMBODIMENTS

The present application will be further illustrated and explained with reference to specific embodiments. Technical features of various embodiments of the present application can be combined accordingly without conflicting with each other.

According to the method, the problem of dynamic scheduling of waterway transportation among large port terminals is considered, and the nodes and time series of taking a specific number of containers from a specific terminal and transporting them to a destination terminal within a certain time window are determined. The overall goal is to complete the transportation tasks among all terminals, and at the same time, wAGVs have the shortest driving distances, the shortest waiting times and the shortest delay times at the terminals.

Figure 1:
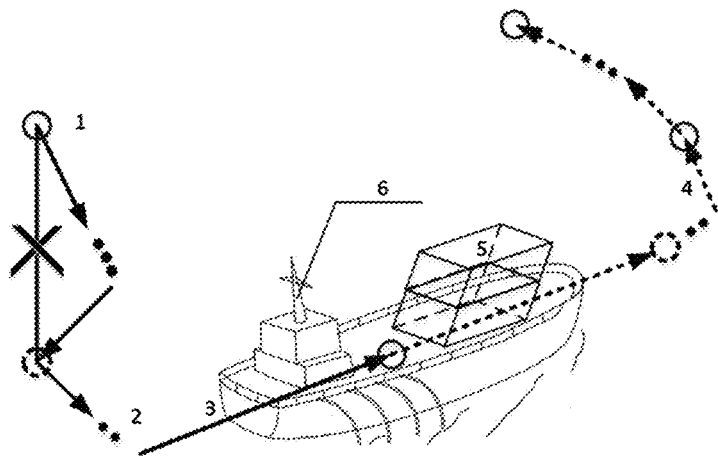
FIG. 1 is a schematic diagram of a dynamic planning path for a wAGV;
in which, 1, Container terminal, 2, Waterway node, 3, Planned completed path, 4, Planned but uncompleted path, 5,1 TEU container, 6, wAGV.

FIG. 1 is a schematic diagram of a dynamic planned path for a wAGV. Because the planned transportation tasks may not be finished at the new decision time step, the scheduling decision at the new decision time step needs to consider both the previous uncompleted tasks and the newly arrived transportation tasks.

Based on the above scheduling decision requirements, this embodiment provides a scheduling method for fully autonomous waterborne inter terminal transportation, which mainly includes the following steps:

1) modeling against a fully autonomous waterborne inter terminal transportation scheduling problem, establishing a wAGV-oriented mixed integer programming dynamic scheduling model, and solving the mixed integer programming problem to obtain a starting optimal path of the scheduling system;

2) inserting a newly arrived transportation task into the possible positions in all the existing paths of wAGVs calculated in the previous step but has not been completely executed within a rolling horizon framework, and calculating the corresponding insertion cost, comparing and selecting the paths and positions that are with the minimal cost, inserting the task into the path, processing all the newly arrived transportation tasks in turn and obtaining updated initial paths;

3) based on the updated initial paths, using a heuristic algorithm based on tabu search to further improve the initial path, and obtaining a final scheduling scheme at the current time step, wherein the final scheduling scheme consist of paths of all the wAGVs; the paths of all the wAGVs include terminal node sequences to be visited by all the wAGVs, corresponding visiting times, service times and the number of loading and unloading containers in TEUs;

4) scheduling the wAGVs according to the paths of all the wAGVs obtained by the solution, and repeating steps 2)-4) for each new time step.

It can be seen from the steps of the method of the present application that a dynamic scheduling model is proposed firstly. In this embodiment, the model is a dynamic scheduling mathematical model based on rolling horizons and mixed integer programming. By solving this model, the initial optimized path of the scheduling system is obtained (the modeling and model solving of the present application can occur at any time or time step in the actual transportation scheduling process, and the time of model solving is taken as the initial time step of the method of the present application). After the initial optimized path is obtained, the real-time performance of the scheduling system is considered. For the newly arrived transportation, it needs to be inserted into the existing path, and a new optimized scheduling scheme is obtained by considering constraints and insertion costs. Therefore, according to the present application, an initial path construction method combining a rolling horizon, an insertion method and a path improvement solving algorithm based on tabu search are further provided, so that a final scheduling scheme under the current time step can be obtained, and the final scheduling scheme consist of the paths of all wAGVs in the system; the paths of all wAGVs in the system include terminal node sequences to be visited by all wAGVs, corresponding visiting time, staying time and number of loaded and unloaded cargoes. For the next time step, the initial path construction method combined with the rolling horizon and insertion method, and the improved path heuristic algorithm based on tabu search, which are proposed by the present application, are repeatedly executed considering the path calculated in the previous step and the newly arrived transportation task within the rolling horizon framework, thus completing the full autonomous waterborne inter terminal transportation scheduling in the whole time range.

Each part of the present application will be further explained below.

I. Dynamic Scheduling Based on Rolling Horizon and Mixed Integer Programming

First, the parameters involved in the mathematical model of the scheduling problem are defined. We consider, a time range $t \in [0, \infty]$, a dynamic transportation system with a fleet of $n_v$ wAGVs denoted by V, where the wAGV set executing the tasks is $V_w$. The re-scheduling is performed with an interval $T_s$, and the discrete planning time step is defined as k, then $t=kT_s$.

At each time step k, the tasks unfinished $R_v(k)=R_v^p(k) \cup R_v^d(k)$, $\forall v \in V$ and the newly arrived task $R_{new}(k)$ at $[(k+N_p-1)T_s, (k+N_p)T_s]$ are considered, and the re-scheduling problem is established in the time horizon $[kT_s, (k+N_p)T_s]$, where $R_v^p(k)$ are the tasks that have not yet commenced by $kT_s$, and $R_v^d(k)$ are the tasks for which the container have already been placed on the wAGV v for delivery to the destination terminal.

At the next time step k+1, the scheduling process is repeated and the tasks in the next $N_p$ time steps are considered, thus accounting for the term "rolling horizon". At the same time, the number of containers on each wAGV can be calculated as $l_v(k) \leq Q$, where Q is the maximum capacity of the wAGV. The real-time position of the wAGV is recorded as $(x_v(k), y_v(k))$, the corresponding waterway section is recorded as $g_v(k)$, and the remaining time of staying/serving at the current point is $s_v(k)$. Therefore, the dynamic system state of the wAGV can be expressed $(x_v(k), y_v(k), g_v(k), s_v(k), l_v(k), R_v(k)), \forall v \in V$. The cruising speed of the wAGV is u.

Accordingly, for each transportation task $i \in \cup_{v \in V} R_v(k) \cup R_{new}(k)$, it can be expressed by $(i, p_i, d_i, t_{i,min}, t_{i,max}, q_i, s_i)$ which represent the task number, the pickup terminal, the delivery terminal, the earliest pickup time, the latest delivery time, the number of containers, and the required terminal service time, respectively. For the pickup terminal $p_i$, $q_i>0$; for the delivery terminal $d_i$, $q_i<0$.

The waterway transportation network between terminals is modeled. $V_o(k)=\{1, \ldots, n_v\}$ is defined as the starting node set for all wAGVs and $V_e(k)=\{n_v+2n(k)+n_d(k)+1, \ldots, 2n_v+2n(k)+n_d(k)\}$ as the ending node set for all wAGVs, where $\Sigma_{v \in V}|R_v^p(k)|+|R_{new}(k)|$ is the number of pick-up and delivered transportation tasks, and $n_d(k)$ is the number of delivery-only tasks. All pick-up nodes are defined as $\mathcal{P}(k)=\{n_v+1, \ldots, n_v+n(k)\}$ and the delivery nodes corresponding to the pick-up nodes are $\mathcal{D}(k)=\{n_v+n(k)+1, \ldots, n_v+2n(k)\}$ and the delivery-only nodes are $\mathcal{D}'(k)=\{n_v+2n(k)+1, \ldots, n_v+2n(k)+n_d(k)\}$. Therefore, the transportation network considered for the inter-terminal scheduling problem is $\mathcal{G}(k)=(\mathcal{N}T(k), \mathcal{A}(k))$, where the node set is $\mathcal{N}f(k)=\mathcal{P}(k) \cup \mathcal{D}(k) \cup \mathcal{D}'(k) \cup V_o(k) \cup V_e(k)$, and the edge set is $$\mathcal{A}(k)=\{(i,j)|$$
$$(i,j) \in (\mathcal{P}(k) \cup \mathcal{D}(k) \cup \mathcal{D}'(k)) \times (\mathcal{P}(k) \cup \mathcal{D}(k) \cup \mathcal{D}'(k)))$$
$$\cup \{(i,j)|i \in V_o(k), j \in \mathcal{P}(k) \cup \mathcal{D}(k) \cup \mathcal{D}'(k)\}$$
$$\cup \{(i,j)|i \in \mathcal{P}(k), \cup \mathcal{D}(k) \cup \mathcal{D}'(k, j \in V_e(k)\}, i \neq j\}.$$

The following decision variables are defined:

0-1 binary variable $x_{ij,v}(k)$ for all i, j $\in \mathcal{A}(k)$, $v \in V$, if the wAGV v tavels from node i→j, then $x_{ij,v}(k)=1$, otherwise $x_{ij,v}(k)=0$;

0-1 binary variable $z_{i,v}(k)$ for all $i \in \mathcal{N}(k)$, $v \in V$, if the wAGV v visits the node i, then $z_{i,v}(k)=1$, otherwise $z_{i,v}(k)=0$;

the integer variable $y_i(k)$ for all $i \in \mathcal{N}(k)$ represents the number of containers loaded on the wAGV arriving at the node i;

the continuous variable $A_i(k)$ for all $i \in \mathcal{N}(k)$ represents the time to reach the node i;

the continuous variable $w_i^t(k)$ for all $i \in \mathcal{N}(k)$ represents the waiting time at the node i;

the continuous variable $d_i^t(k)$ for all $i \in \mathcal{N}(k)$ represents the delay time at the node i;

For simplicity of description, •(k) in the dynamic parameters will be omitted below. After these parameters are defined, a mixed integer programming model is established to model the scheduling problem.

$$\min c_1 \Sigma_{v \in V} (\Sigma_{(i,j) \in \mathcal{A}} x_{ijv} d_{ij} + c_2 \|w\|_1 + c_3 \|d\|_1 \quad (1)$$

subject to $$\Sigma_{v \in V} z_{iv} = 1, \forall i \in \mathcal{N} \quad (2)$$

$$z_{iv} = z_{(i+n)v}, \forall i \in \mathcal{P}, v \in V, \quad (3)$$

$$z_{ii} = 1, \forall i \in V_o, \quad (4)$$

$$z_{iv} = 1, \forall i \in \mathcal{D}'(k), v \in V_d, \quad (5)$$

$$\Sigma_{j \in \mathcal{N}} x_{ijv} = \Sigma_{j \in \mathcal{N}} x_{jiv} = z_{iv}, \forall i \in \mathcal{N}, v \in V, \quad (6)$$

$$\Sigma_{j \in \mathcal{N}/V_e} x_{vjv} = 1, \forall v \in V, \quad (7)$$

$$\Sigma_{i \in \mathcal{N}/V_o} x_{i(n_v + 2n(k) + n_d + v)v} = 1, \forall v \in V, \quad (8)$$

$$A_v = kT_s, \forall v \in V_w, \quad (9)$$

$$A_i \leq A_{i+n}, \forall i \in \mathcal{P}_n, \quad (10)$$

$$x_{ijv}(k) = 1 \to \max(A_i, t_{i,min}) + s_i + \frac{d_{ij}}{u} = A_j, \forall (i,j) \in \mathcal{A}, v \in \mathcal{V}, \quad (11)$$

$$t_{i,min} - w_i \leq A_i \leq t_{i,max} - s_i + d_i, \forall i \in \mathcal{N}, \quad (12)$$

$$0 \leq w_i \leq w_{max}, \forall i \in \mathcal{N}, \quad (13)$$

$$0 \leq d_i \leq d_{max}, \forall i \in \mathcal{N}, \quad (14)$$

$$y_{v_0} = l_v, \forall v \in V, \quad (15)$$

$$x_{ijv}(k) = 1 \to y_i + q_i = y_j, \forall i \in \mathcal{N}, v \in V, \quad (16)$$

$$0 \leq y_j \leq Q, \forall i \in \mathcal{N}, \quad (17)$$

$$x_{ijv}, z_{iv} \in \{0,1\}, \quad (18)$$

In formula (1), the first term minimizes the total travel distance, while the second term and the third term minimize the waiting time and the delay time, respectively. $c_1$, $c_2$ and $c_3$ are the weight coefficients among them. Formulas (2)-(18) represent constraints such as consistency, time, capacity and 0-1 integer variable, respectively. Specifically, formula (2) constrains each node is visited by one and only one wAGV, and formula (3) defines for each pair of pick-up and delivery nodes, the pick-up node is visited before the delivery node and is visited by the same wAGV. Formulas (4) and (5) ensure that the wAGV will visit the starting node and the ending node with containers. Formula (6) means that the wAGV will only enter and exit a certain node if it visits that node. Formulas (7) and (8) constrain the wAGV to start and end at correct nodes. Formula (9) constrains the time consistency of the wAGVs that are executing tasks. Formula (10) ensures delivery after picking up. Formula (11) constrains the time consistency between adjacent visited nodes. Formulas (12)-(14) define time window constraints. The capacity constraints are defined by formulas (15)-(17). The 0-1 integer variable is defined by formula (18).

Because the problem defined by formulas (1)-(18) is a complex combinatorial optimization problem, it is used to solve the starting path when the number of transportation tasks at the first step is small in the actual scheduling system. The modeling and model solution of the present application can take place at any time or time step (preferably the initial stage when the number of transportation tasks is small) in the actual transportation scheduling process. The present application takes the starting time as the initial time step of the present method, and further proposes an efficient real-time solution algorithm (heuristic real-time solution algorithm) for the situation that transportation tasks come in real time, and a large number of transportation tasks need to be handled in subsequent time steps.

II. Real-Time Heuristic Solution Algorithm

Firstly, according to the path calculated in the previous step but has not been completely executed in the rolling horizon framework, the newly arrived task is inserted according to certain rules, and an initial planned path is obtained.

For all the wAGVs, the incomplete path thereof is defined as $\mathcal{R}_v(k) = \{r_1, \ldots, r_m\}$, where $r_i$, $r_i$, i=m is a node to be visited in the previous plan by wAGV v. Note $\mathcal{R}_v(k)$ may be an empty set. If the newly arrived transportation task is $\langle p_i, d_i \rangle$, the cost of inserting this task into all possible positions in the existing paths of the wAGV will be calculated once, and these insertion positions need to meet the constraints such as time window, capacity, pick-up followed by delivery and non-transshipment. For the pick-up node $p_i$, the task is inserted into an edge $\langle r_i, r_j \rangle$ of a certain path $\mathcal{R}_v(k)$; if neither the capacity nor the time window constraints are violated, calculating the insertion cost as:

$$\Delta d_p = d_{r_i p_i} + d_{p_i r_j} - d_{r_i r_j}$$

The costs of all possible insertion positions of the pick-up node $p_i$ are sorted in an ascending order, and then starting from the smallest $\Delta d_p$, $d_i$ is inserted after the corresponding point $p_i$ in a similar way. The insertion cost of $d_i$ is calculated as $\Delta d_d$ for the position that does not violate the constraints. For $d_i$, if it is detected that an insertion point violates the capacity constraint, the remaining insertion positions can be skipped. The minimum $\Delta d_d$ value and the current corresponding $\Delta d_p$ are found out, then the cost of inserting the new task $\langle p_i, d_i \rangle$ into the path $\mathcal{R}_v(k)$ is $\Delta d_p + \Delta d_d$. The costs of inserting $\langle p_i, d_i \rangle$ into current paths of all wAGVs are sequentially calculated, and the paths and positions corresponding to the selected minimal cost value are selected, and the task is inserted to update the path. All newly arrived transportation tasks are processed in turn to obtain updated initial paths.

Based on the obtained initial path, tabu search is used to improve it. Tabu search is a kind of neighborhood search. However, there are two main differences between its search rules and other neighborhood search methods. First, during iterations, it allows the incumbent solution to be temporarily inferior to the current best solution, thus avoiding falling into the local optimal solution. Secondly, tabu search defines a tabu data structure to memorize the most recently executed actions, so that only the actions not in this memory structure can be executed in the future, so as to avoid iteration falling into an infinite loop. When the incumbent solution is better than the global optimal solution, this tabu action can also be forgiven.

Firstly, the neighborhood space of the current solution is designed. Because of constraints such as pickup followed by delivering and no transshipment, it is necessary to consider the simultaneous movement of the pick-up node and the delivery node when designing the neighborhood.

Figure 2:
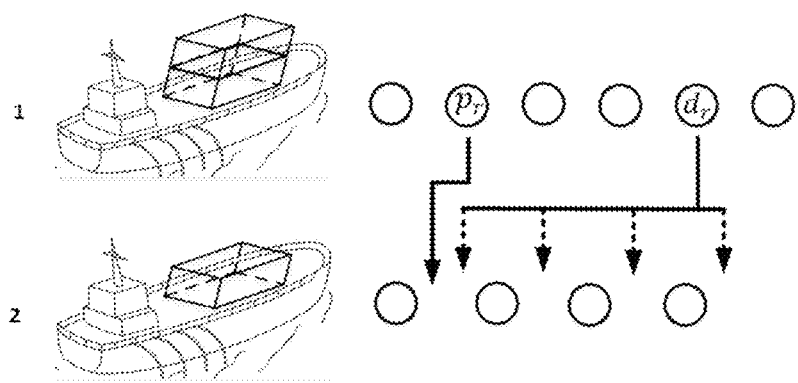
FIG. 2 is a schematic diagram of the neighborhood of the select-insert action.

Two kinds of neighborhoods are designed. The first one is to arbitrarily select any group of pick-up and delivery nodes in two of the paths in the existing solution, delete the pick-up and delivery nodes from the initial route first, and then insert them into the other path, as shown in FIG. 2. Different from the previous new task insertion, only the capacity constraint needs to be strictly met, and the time window constraint is similar to formula (1), which only involves penalty for the waiting time and the delay time, but does not need to be strictly met.

Figure 3:
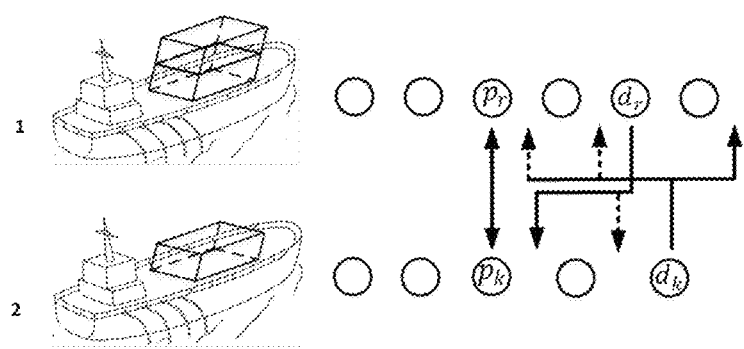
FIG. 3 is a schematic diagram of the neighborhood of an exchange action.

The second neighborhood structure is to exchange a group of pick-up and delivery nodes in two arbitrarily selected paths, that is, pick-up and delivery node pairs are selected from two paths first, and then are deleted from the initial route, and then the pick-up and delivery node pairs are inserted into another path, as shown in FIG. 3. Similarly, the capacity constraint needs to be strictly met, and the time window constraint takes the way of penalty in the cost function.

Based on the designed neighborhoods, two matrices are defined to store neighborhood search and iteration information. At first, an n×n (n≤$n_v$) dimensional matrix is defined to store the optimal solution information obtained by neighborhood transformation between any two path pairs and the sequence number of the path pair, wherein the sequence number is a row sequence number of a defined second matrix. The second matrix stores the information of two interchanged routes, including the IDs of the routes, positions in the routes and number of tasks, etc. By this structure, in each iteration, we only need to update the matrix information that is related to the changed routes in the previous iteration instead of all paths. At the same time, a tabu table is defined, wherein the tabu table comprises tabu objects and tabu lengths. The tabu objects are defined as a transportation task ID and a path ID, and the tabu length is positioned as a sum of a number of current iteration steps and a preset number of steps of tabu release, and when the number of iteration steps is less than the tabu length, the transportation tasks in the tabu objects cannot be inserted into the corresponding path, so as to avoid iteration falling into a loop. In each iteration, selecting the neighborhood transformation with the most cost reduction; if the transformed cost value is smaller than the current recorded minimum cost value and the transformation is not in the tabu table, recording the cost value as the minimum cost value and updating the path; it shall be noted that each iteration only needs to update the matrix information corresponding to the path with neighborhood transformation in the matrix, and does not need to update the matrices of all paths. The above steps are repeated for iteration, and the quality of the scheduling scheme is gradually improved to be quasi-optimal through continuous neighborhood change and path update; wherein the final scheduling scheme is the paths of all wAGVs, including the sequence of terminal nodes to be visited, the corresponding arrival times, stopping times and the number of loaded and unloaded cargoes.

The system for the fully autonomous waterborne inter terminal transportation scheduling according to the present application includes a wAGV system, an initial path solving module of a dynamic scheduling model, an initial path construction module, a real-time optimization module and a scheduling module.

The wAGV system comprises a number of wAGVs, which are controlled by the scheduling module to execute transportation tasks.

The initial path solving module of the dynamic scheduling model is used for acquiring parameters involved in defining the dynamic scheduling model, establishing the dynamic scheduling model, determining constraints of the model and acquiring a first initial scheduling path of the scheduling system.

The initial path construction module inserts new transportation tasks into the possible positions in all the existing wAGV paths according to the paths calculated in the previous step but has not been completely executed within a rolling horizon framework, calculates the insertion cost and selects paths and corresponding positions with the lowest insertion cost, selects the paths and positions corresponding to the minimum cost, inserts the task into updated paths, and sequentially processes all new transportation tasks and obtains updated initial paths.

The real-time optimization module adopts a heuristic algorithm based on tabu search, combines the initial paths obtained by the initial path construction module and constraints of the dynamic scheduling model to obtain a quasi-optimal scheduling result within the rolling horizon framework, and realizes the real-time scheduling system.

The scheduling module is used for controlling, according to the scheduled paths obtained by the real-time optimization module, the wAGVs to visit specific terminals at specific times, picking up or unloading a specific number of containers, and completing the assigned transportation task in an approximately shortest driving path, with the minimum waiting time and delay time.

In order to verify the effectiveness of the proposed algorithm, a simulation experiment is carried out using the data of multi-terminal transportation in the port of Rotterdam.

Figure 4:
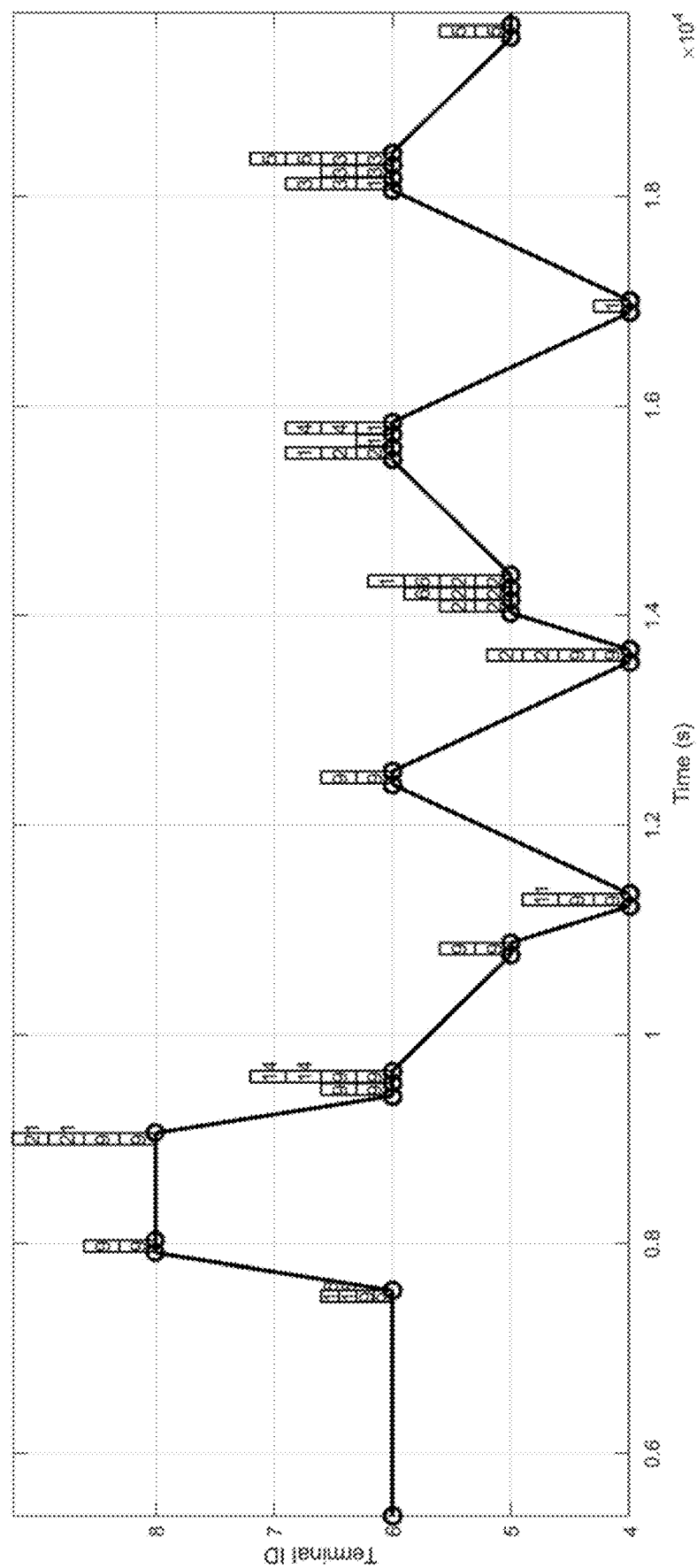
FIG. 4 is a planned path at time step k=7.
Figure 5:
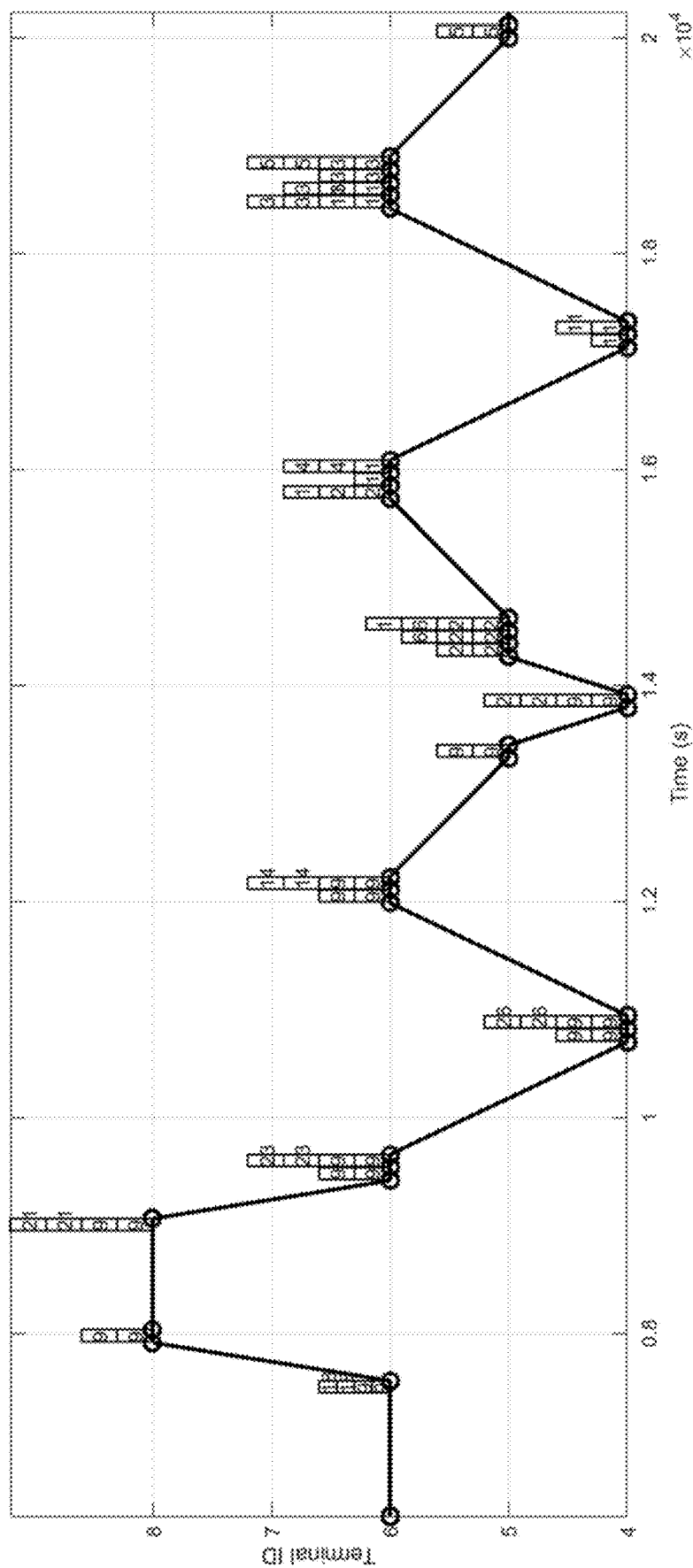
FIG. 5 is a planned path at time step k=8.

The number of the wAGVs is 8, $T_s$=15 min., $N_p$=4, i.e., the scheduling time domain to 1 hour. FIG. 4 and FIG. 5 show the planned path of one of the wAGVs for two consecutive time steps k=7 and k=8. The small rectangle on the path indicates 1 TEU, and the number above indicates the transport task number to which the container belongs. FIGS. 4 and 5 contain the planned results of this time step: the ID of the terminal to be visited, the arrival and departure times, and the number of containers to be loaded and unloaded. For example, in FIG. 4, when the wAGV leaves the terminal 6, there are 2 containers of the task 9 and 2 containers of the task 18; next, the wAGV arrives the terminal 8, then the two containers of the task 18 are unloaded first, and then the two containers of the task 21 are loaded. Loading and unloading operations at the same terminal are often carried out together to reduce the total distance traveled. Comparing the planned paths for k=7 and k=8, it can be seen that newly arriving tasks 23 and 26 are inserted into the path for k=7. The operations that happen at the same terminal node are integrated to reduce the driving distance.

Figure 6A:
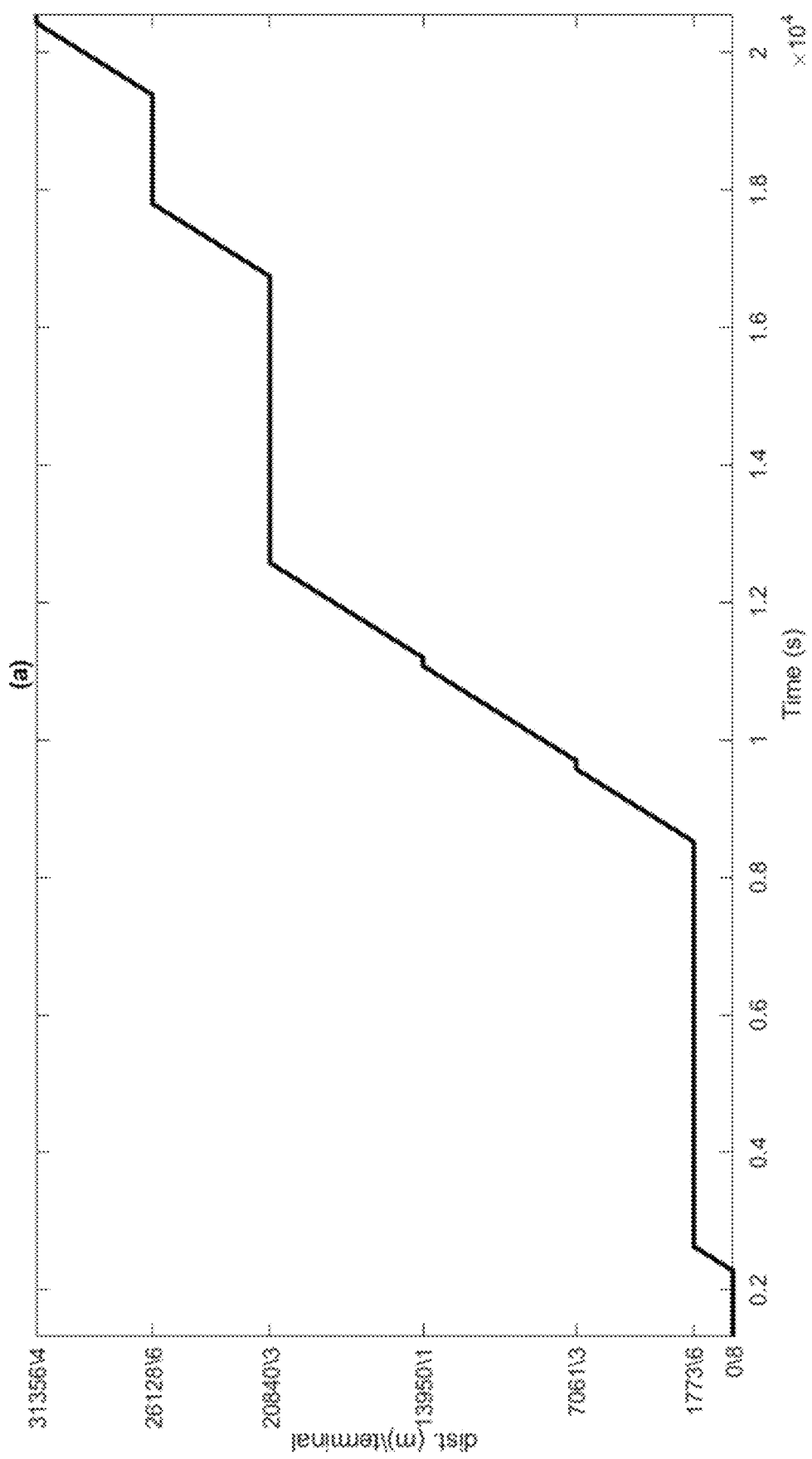
FIG. 6 shows a diagram of travel-distance/terminal ID vs. time of waterborne AGV 2.
Figure 6B:
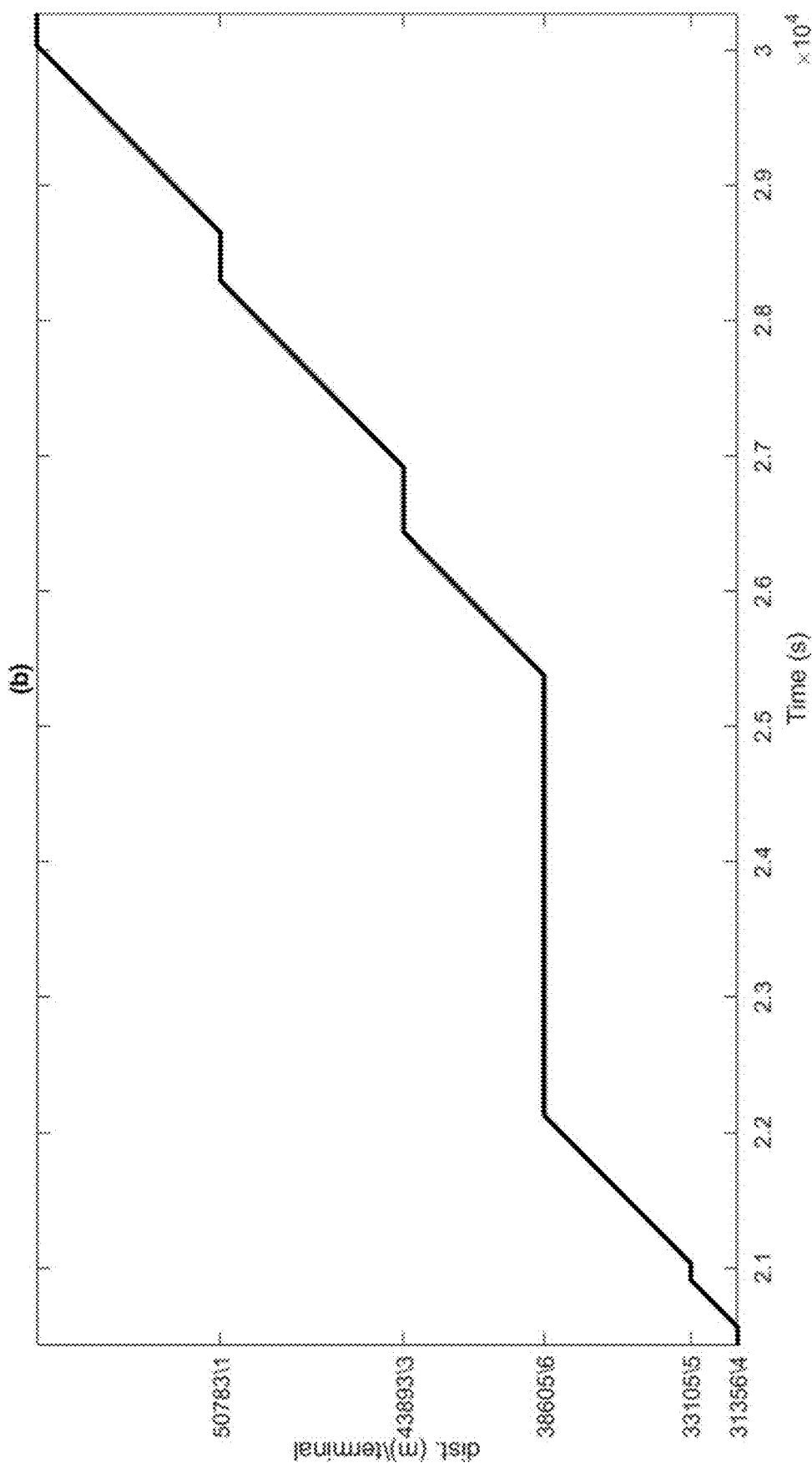
Figure 6C:
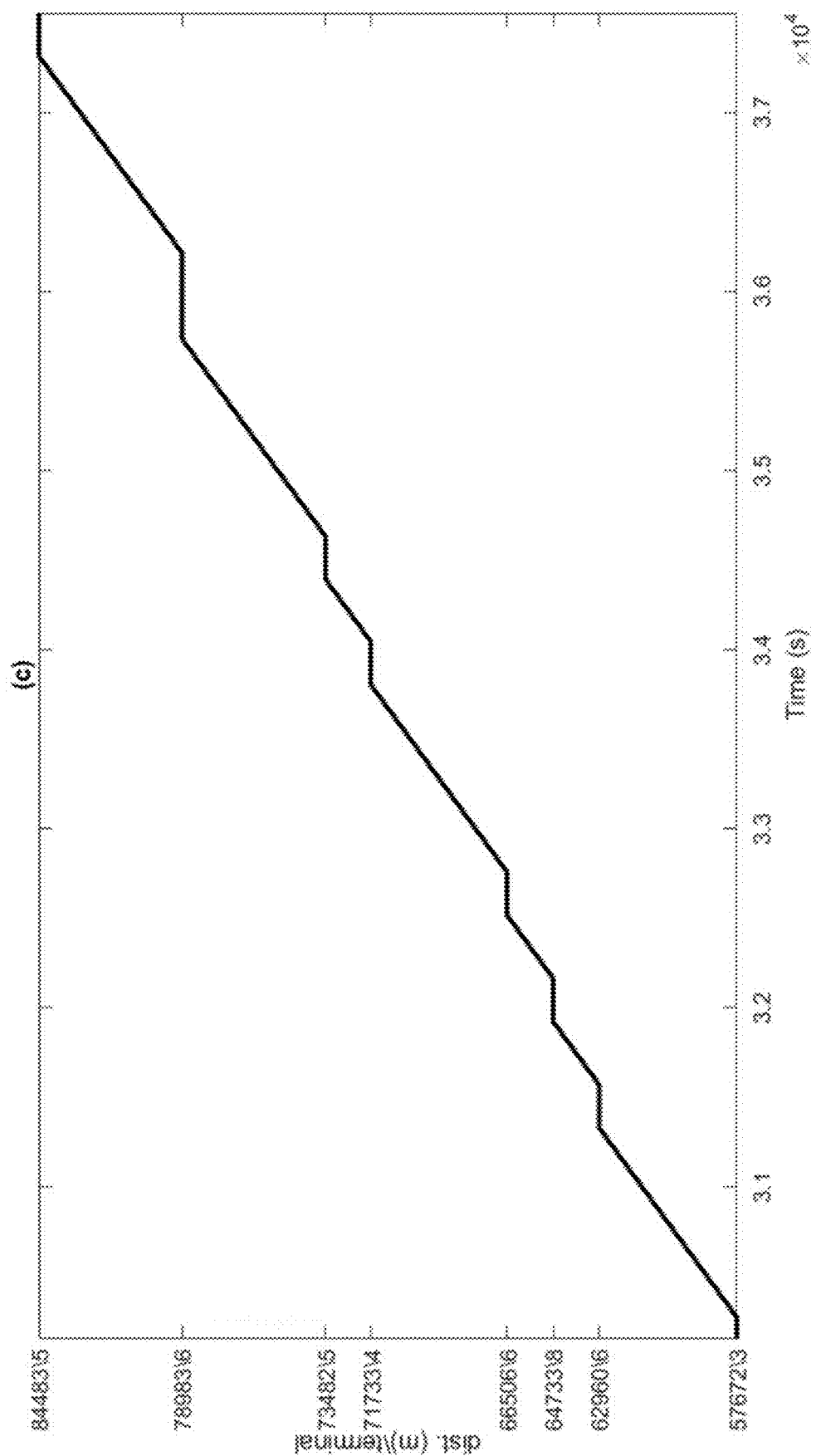

FIG. 6 shows the accumulation of traveling distance of one of the wAGVs over time, and the visited terminal is also marked in the figure. Whenever the wAGV arrives at a terminal, it will stay for a period of time to complete the loading and unloading operation. The reason for the wAGV to stay for different periods of time at different terminals is that loading and unloading operations of multiple tasks need to be carried out at certain terminals, or the wAGV needs to wait for the start of tasks at that terminal.

Figure 7:
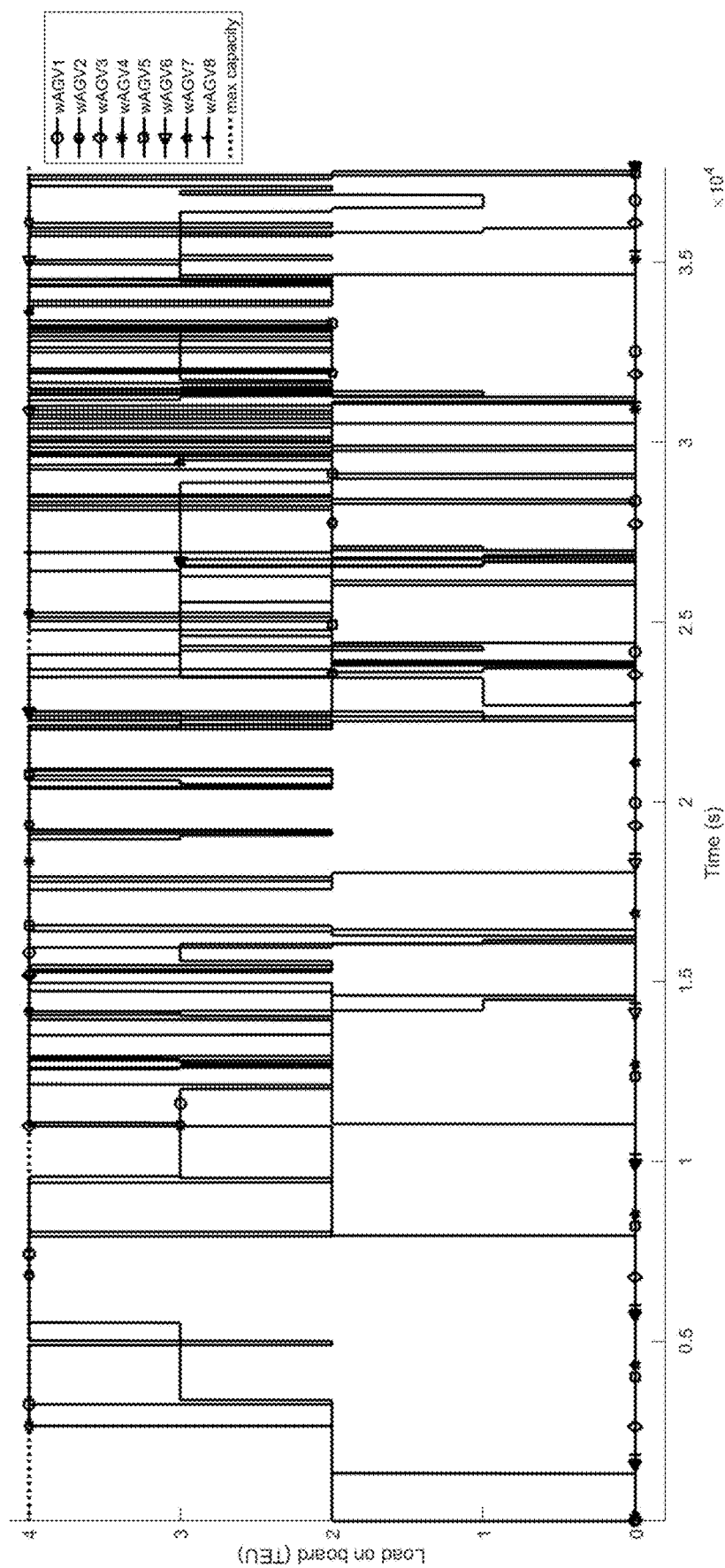
FIG. 7 shows the loads on board waterborne AGVs.

As the wAGV has the maximum capacity limit, the number of containers on board all eight wAGVs in the whole simulation period is given in FIG. 7. It can be seen that all wAGVs are not overloaded, that is, the number of containers has never exceeded the upper limit of the capacity of 4 TEU.

Figure 8:
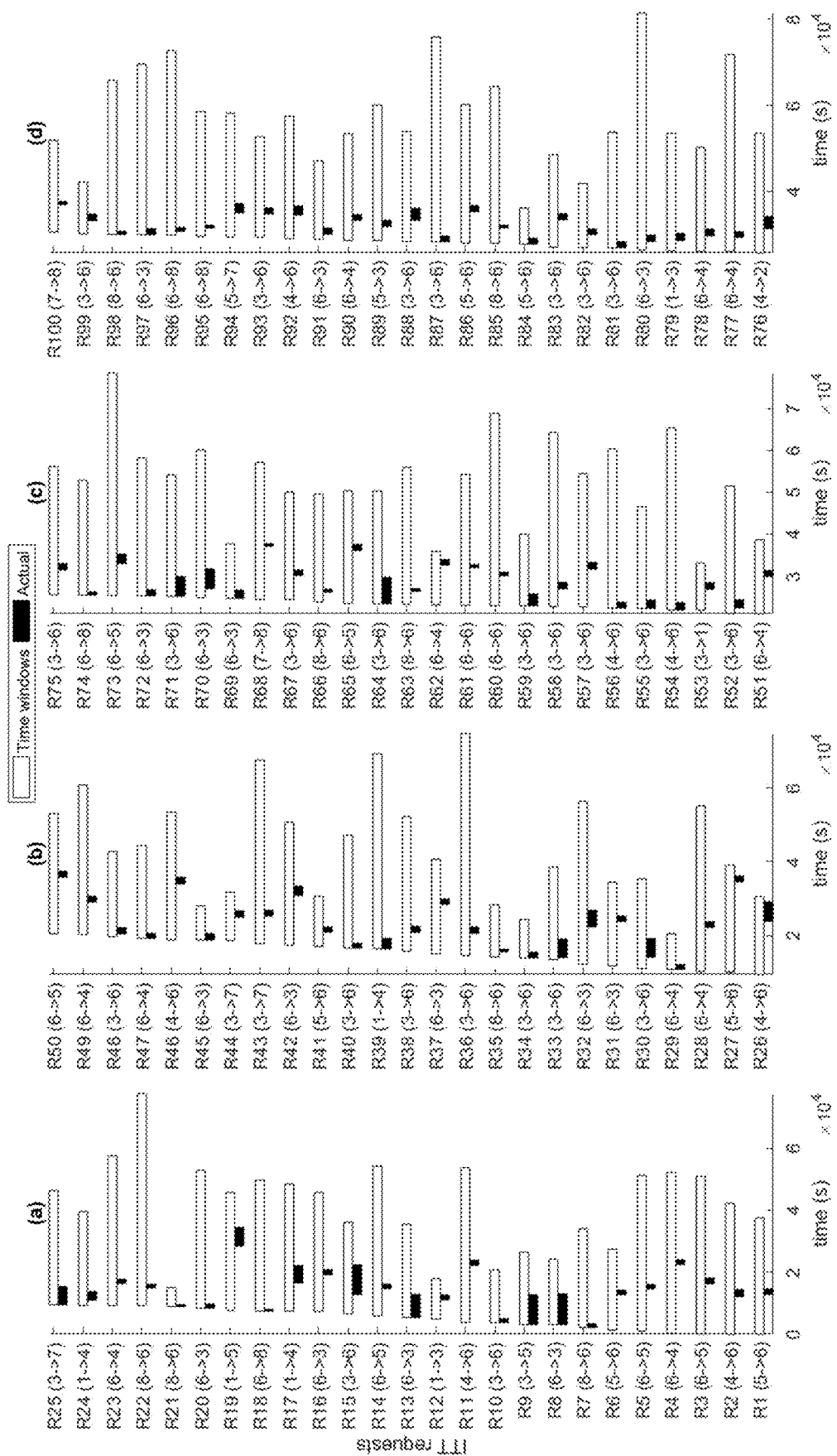
FIG. 8 is a diagram showing the satisfaction of request time windows.

For the time window constraint, the set time difference of all transportation tasks and the time required for task time completion are shown in FIG. 8. All tasks are completed within the time window, which also shows the effectiveness of the scheduling algorithm.

The above examples only express several embodiments of the present application, and their descriptions are specific and detailed, but they cannot be understood as limiting the scope of the patent of the present application. It should be pointed out that, for those of ordinary skill in the field, without departing from the concept of the present application, several modifications and improvements can be made, which belong to the protection scope of the present application. Therefore, the scope of protection of the patent of the present application shall be subject to the appended claims.

What is claimed is:

1. A scheduling method for fully autonomous waterborne inter terminal transportation, applied in an autonomous waterborne transportation system for dynamic scheduling of waterborne autonomous guided vessels (wAGV), comprising the following steps:
   1) acquiring parameters involved in defining a wAGV oriented mixed integer programming dynamic scheduling model, modeling against a fully autonomous waterborne inter terminal transportation scheduling problem, establishing the mixed integer programming dynamic scheduling model based on the parameters, and solving the mixed integer programming dynamic scheduling model to obtain a starting optimal path for a scheduling system, the parameters including waterway distance which is not a straight line Euclidean distance and waiting time;
   2) inserting a newly arrived transportation task into the possible positions in all the existing paths of wAGVs calculated in the previous step but has not been completely executed within a rolling horizon framework, and calculating the corresponding insertion cost, comparing and selecting paths and positions that are with the minimum cost, inserting the task into the path, processing all the newly arrived transportation tasks in turn and obtaining updated initial paths;
   3) based on the updated initial paths, using a heuristic algorithm based on tabu search to further improve the initial path, and solving to obtain a final scheduling scheme at the current time step based on constraints of the dynamic scheduling model, the constraints including pickup followed by delivering and no transshipment, wherein the final scheduling scheme is paths of all the wAGVs; the paths of all the wAGVs include terminal node sequences to be visited by all the wAGVs, corresponding visiting times, service times and the number of loading and unloading containers in TEUs;
   4) scheduling the wAGVs according to the paths of all the wAGVs obtained by the solution, and repeating steps 2) to 4) for each new time step.

2. The method for the fully autonomous waterborne inter terminal transportation scheduling according to claim 1, wherein
   performance indexes of the dynamic scheduling model are as follows:

$$\min c_1 \Sigma_{v \in V} \Sigma_{(i,j) \in \mathcal{A}} x_{ijv} D_{ij} + c_2 \|w\|_1 + c_3 \|d\|_1 \quad (1),$$

where $c_1$, $c_2$ and $c_3$ are weight coefficients of the three performance indexes in the model, wherein the first item minimizes the total driving distance, and the second item and the third item minimize the waiting time and the delay time, respectively; $x_{ijv}(k)$ is integer binary variable with value of 0 or -1; for all $(i,j) \in \mathcal{A}(k)$, $v \in V$, if wAGV v travles from node i to node j, then $x_{ijv}(k)=1$, otherwise $x_{ijv}(k)=0$; V is a fleet set with $n_v$ wAGVs; $D_{ij}$ is the waterway distance between the nodes i and j; vector $w=[w_i^t]$, $i \in \mathcal{N}(k)$, where $w_i^t$ represents the waiting time at the node i; vector $d=[d_i^t]$, $i \in \mathcal{N}(k)$, where $d_i^t$ represents the delay time at the node i; $\|\cdot\|_1$ represents a 1 norm; $\mathcal{N}(k)$ is a node set of an inter terminal scheduling transport network, and $\mathcal{A}(k)$ is an edge set of the inter terminal scheduling transport network.

3. The method for the fully autonomous waterborne inter terminal transportation scheduling according to claim 2, wherein
   constraints of the dynamic scheduling model comprise:

$$\Sigma_{v \in V} z_{iv} = 1, \forall i \in \mathcal{N}, \quad (2)$$

$$z_{iv} = z_{(i+n)v}, \forall i \in \mathcal{P}, v \in V, \quad (3)$$

$$z_{ii} = 1, \forall i \in V_o, \quad (4)$$

$$z_{iv} = 1, \forall i \in \mathcal{D}'(k), v \in V_d, \quad (5)$$

$$\Sigma_{j \in \mathcal{N}} x_{ijv} = \Sigma_{j \in \mathcal{N}} x_{jiv} = z_{iv}, \forall i \in \mathcal{N}, v \in V, \quad (6)$$

$$\Sigma_{j \in \mathcal{N} / V_e} x_{vjv} = 1, \forall v \in V, \quad (7)$$

$$\Sigma_{i \in \mathcal{N} / V_o} x_{i(n_v+2n(k)+n_d+v)v} = 1, \forall v \in V, \quad (8)$$

$$A_v = kT_s, \forall v \in V_w, \quad (9)$$

$$A_i \leq A_{i+n}, \forall i \in \mathcal{P}_n, \quad (10)$$

$$x_{ijv}(k) = 1 \rightarrow \max(A_i, t_{i,min}) + s_i + \frac{d_{ij}}{u} = A_j, \forall (i,j) \in \mathcal{A}, v \in V, \quad (11)$$

$$t_{i,min} - w_i \leq A_i \leq t_{i,max} - s_i + d_i, \forall i \in \mathcal{N}, \quad (12)$$

$$0 \leq w_i \leq w_{max}, \forall i \in \mathcal{N}, \quad (13)$$

$$0 \leq d_i \leq d_{max}, \forall i \in \mathcal{N}, \quad (14)$$

$$y_{v_0} = l_v, \forall v \in V, \quad (15)$$

$$x_{ijv}(k) = 1 \rightarrow y_i + q_i = y_j, \forall i \in \mathcal{N}, v \in V, \quad (16)$$

$$0 \leq y_i \leq Q, \forall i \in \mathcal{N}, \quad (17)$$

$$x_{ijv}, z_{iv} \in \{0,1\}, \quad (18)$$

where $z_{iv}(k)$ is an integer variable from 0 to 1; for all $i \in \mathcal{N}(k)$, $v \in V$, if a wAGV v visits the node i, then $z_{iv}(k)=1$, otherwise $z_{iv}(k)=0$; $V_o(k)=\{1, \ldots, n_v\}$ is defined as a starting node set of all the wAGVs, and $V_e(k)=\{n_v+2n(k)+n_d+1, \ldots, 2n_v+2n(k)+n_d\}$ is defined as an ending node set of all the wAGVs; wherein $n(k)=\Sigma_{v \in V} |R_v^P(k)| + |R_{new}(k)|$ is a number of pickup and delivery tasks, and $n_d$ is a number of delivery-only tasks; all pick-up nodes are defined as $\mathcal{P}(k) = \{n_v+1, \ldots, n_v+n(k)\}$, delivery nodes corresponding to the pick-up nodes are defined as $\mathcal{D}(k)=\{n_v+n(k)+1, \ldots, n_v+2n(k)\}$, and the delivery-only nodes are defined as $\mathcal{D}'(k)=\{n_v+2n(k)+1, \ldots, n_v+2n(k)+n_d(k)\}$, in which u is a cruising speed of the wAGV, $T_s$ is a step length of the time step, k is a discrete time step serial number, $A_i$ represents the time arriving at the node i, $y_i$ is a number of containers loaded on the wAGV arrived at the node i, $s_i$ is a required terminal service time, $t_{i,min}$, $t_{i,max}$ are an earliest pickup time and a latest delivery time, respectively; Q is a maximum loading capacity of the wAGV, a subscript max indicates a maximum allowable value of corresponding physical quantity, and a subscript min indicates a minimum allowable value of the corresponding physical quantity.

4. The method for the fully autonomous waterborne inter terminal transportation scheduling according to claim 1, wherein the step of inserting a newly arrived transportation task into possible positions in all existing paths of the wAGVs, and calculating an insertion cost according to a path calculated in the previous step but has not been completely executed under a rolling horizon framework comprises:

for all the wAGVs, defining an incomplete path thereof as $\mathcal{R}_v(k)=\{r_1, \ldots, r_m\}$, where $r_i$, i=1, ..., m is a node to be visited in a previous plan of the wAGV v, and $\mathcal{R}_v(k)$ may be an empty set; assuming that the newly arrived transportation task is $\langle p_i, d_i \rangle$, inserting the task into all possible positions in the existing paths of the wAGVs, and calculating the insertion cost; for the pick-up node $p_i$, inserting the task into an edge $\langle r_i, r_j \rangle$ of a certain path $\mathcal{R}_v(k)$; if neither the capacity nor the time window constraints are violated, calculating the insertion cost as:

$$\Delta d_p = d_{r_i p_i} + d_{p_i r_j} - d_{r_i r_j},$$

where $d_{r_i p_i}$ represents a distance from the node $r_i$ to the node $p_i$; sorting the costs of all possible insertion positions of the pick-up node $p_i$ in an ascending order, and then starting from the smallest $\Delta d_p$, inserting, in a similar way, the delivery node $d_i$ into the possible positions which do not violate the capacity and the time window constraints after the corresponding picking node $p_i$, and calculating the insertion cost of the delivery node $d_i$ as $\Delta d_d$; selecting a minimum $\Delta d_d$ value and the current corresponding $\Delta d_p$, then the cost of inserting the new task $\langle p_i, d_i \rangle$ into the path $\mathcal{R}_v(k)$ being $\Delta d_p + \Delta d_d$; sequentially calculating the cost of inserting $\langle p_i, d_i \rangle$ into current paths of all wAGVs and selecting the paths and positions corresponding to the selected minimal cost value, and inserting the task to update the path; processing all newly arrived transportation tasks in turn according to an arrival time sequence.

5. The method for the fully autonomous waterborne inter terminal transportation scheduling according to claim 1, wherein the step 3) comprises:

3.1) designing a neighborhood space of the current solution;

3.2) defining two matrices to store neighborhood search and iterative information; first, defining an n×n-dimensional matrix, where n≤$n_v$, which stores optimal solution information obtained after neighborhood transformation between any two path pairs and a sequence number of the path pair, wherein the sequence number is a row sequence number of a defined second matrix; the second matrix stores neighborhood transformation information of the corresponding path pair, including ID of two path involved in the transformation, the number of tasks transformed in the two paths and the positions in the path;

3.3) defining a tabu table, wherein the tabu table comprises tabu objects and tabu lengths, the tabu objects are defined as a transportation task ID and a path ID, and the tabu length is positioned as a sum of a number of current iteration steps and a preset number of steps of tabu release, and when the number of iteration steps is less than the tabu length, the transportation tasks in the tabu objects cannot be inserted into the corresponding path, so as to avoid the iteration from falling into a loop;

3.4) in each iteration, selecting the neighborhood transformation with the most cost reduction; if the transformed cost value is smaller than the current recorded minimum cost value and the transformation is not in the tabu table, recording the cost value as the minimum cost value and updating the path; it is noted that each iteration only needs to update the matrix information corresponding to the path with neighborhood transformation in the matrix, rather than update the matrices of all paths;

3.5) repeating the above steps from 3.1) to 3.4) for iteration, and gradually improving the quality of the scheduling scheme to approximate optimum through continuous neighborhood change and path update; wherein the final scheduling scheme is the paths of all the wAGVs, including the sequence of terminal nodes to be visited, the corresponding visit time, staying time and the number of loaded and unloaded cargoes.

6. The method for the fully autonomous waterborne inter terminal transportation scheduling according to claim 5, wherein the step 3.1) comprises:

designing two kinds of neighborhood spaces, wherein the first structure is to arbitrarily select any group of pick-up and delivery nodes in one of the two paths in the existing solution, first delete the pick-up and delivery nodes from the initial route, and then insert them into the other path; before inserting another path, it is necessary to detect whether the capacity constraint is satisfied, and the waiting time or the delay time generated due to the time window constraint is used for calculating the insertion cost along with the driving distance according to the weight in the dynamic scheduling model;

the second neighborhood structure is to exchange a group of pick-up and delivery nodes in two arbitrarily selected paths, that is, selecting pick-up and delivery node pairs from the two paths first, and then deleting from the initial route, and then inserting the pick-up and delivery node pairs into another path; before inserting another path, it is necessary to check whether the capacity constraint is satisfied, and the waiting time or the delay time generated due to the time window constraint is used for calculating the insertion cost along with the driving distance according to the weight in the dynamic scheduling model.

7. A system for fully autonomous waterborne inter terminal transportation scheduling, comprising a waterborne autonomous guided vessel (wAGV) system, an initial path solving module of a dynamic scheduling model, an initial path construction module, a real-time optimization module and a scheduling module; wherein the wAGV system comprises a number of wAGVs which are controlled by the scheduling module to execute transportation tasks;

the initial path solving module of the dynamic scheduling model is configured for acquiring parameters involved in defining the dynamic scheduling model, establishing the dynamic scheduling model, determining constraints of the model and acquiring a first initial scheduling path of the scheduling system, the parameters including waterway distance which is not a straight line Euclidean distance and waiting time;

the initial path construction module is configured for inserting new transportation tasks into the possible positions in all the existing wAGV paths according to the paths calculated in a previous step but has not been completely executed within a rolling horizon framework, calculating the insertion cost and selects paths and corresponding positions with the lowest insertion cost, selecting the paths and positions corresponding to the minimum cost, inserting the task into updated paths, and sequentially processing all new transportation tasks and obtaining updated initial paths;

the real-time optimization module is configured by adopting a heuristic algorithm based on tabu search, combining the initial paths obtained by the initial path construction module and constraints of the dynamic scheduling model to obtain a quasi-optimal scheduling result within the rolling horizon framework, and realizing the real-time scheduling system, the constraints including pickup followed by delivering and no transshipment; and the scheduling module is configured for controlling, according to the scheduling result according to the paths of all wAGVs in the current rolling horizon step obtained by the real-time optimization module, the wAGVs to visit specific terminals at specific times according to the scheduling result according to the paths of all wAGVs in the current rolling horizon framework obtained by the real-time optimization module, picking up or unloading a specific number of containers, and completing the assigned transportation task in an approximately shortest driving path with the minimum waiting time and delay time.

* * * * *